United States Patent Office 2,765,290
Patented Oct. 2, 1956

2,765,290

SOIL CONDITIONING

George E. Ziegler, Evanston, Ill., assignor to Zonolite Company, Chicago, Ill., a corporation of Montana No Drawing. Application May 15, 1952,
Serial No. 288,045

15 Claims. (Cl. 260—41)

My invention relates to improvements in the conditioning of soil-like media, adapted for plant growth, and more particularly, to improved methods of preparing and treating such soil-like media and the soil conditioners for use therewith, and to improved compositions adapted for use in such methods.

Exfoliated particulate vermiculite is a material that is widely used both as a soil conditioner and as a principal constituent of synthetic soil-like plant growing media. The characteristics of particulate vermiculite, in its exfoliated form, make such material particularly valuable for use in soil-like plant growing media. Exfoliated vermiculite has a very great internal surface area per unit volume, which accounts for the fact that this material will absorb up to 200–300 percent or more of its weight in water. The water retentivity properties of exfoliated vermiculite are thus substantially greater than the corresponding properties of other earth-like materials. Furthermore, exfoliated vermiculite is extremely easily handled since it has a density of about 8–10 pounds per cubic foot, as compared to sand, for example, which has a density of about 75–80 pounds per cubic foot. The general properties and the procedures for the preparation of exfoliated particulate vermiculite, as a soil conditioner, are well known to the art and are described in detail in the patent and other literature and, therefore, need not be further elaborated upon herein.

It has also been suggested that certain synthetic polymeric organic compounds might be used in combination with earth-like materials for a variety of different purposes, including aggregate coating for use in bituminous material, water sealing of earth formations for use in oil drilling, and soil conditioning. The compounds most generally suggested for such purposes include the lower molecular weight water-soluble aldehyde-condensation products. Recently, however, it has been suggested that a water soluble sodium polyacrylate having a molecular weight greater than 50,000 (sold under the trade name "Krilium") might be used in soil treatment. It has been found, however, that such polyacrylates present somewhat of a storage problem, presumably because of their hygroscopicity. Also, one of the principal factors that is understood to affect the functions of such polyacrylates is the clay content of the soil, which is a variable.

My invention consists in the preparation and treatment of soil-like media by the use of a combination of exfoliated particulate vermiculite and such a water soluble polyacrylate compound, and compositions of such combination for use in soil treatment, and the improved soil-like material resulting from the use of such compositions. My invention is based upon a discovery of a unique and unexpected cooperation between exfoliated particulate vermiculite and such water soluble polyacrylate compounds in soil conditioner compositions as well as in the soil-like media resulting from the use thereof.

It is, therefore, an important object of my invention to provide an improved method for the preparation and for the treatment for soil-like media and to provide compositions for such purposes.

It is a further object of my invention to provide improved soil-like media having increased aeration, improved structural stability, better water retention, and better workability.

It is another object of my invention to provide an improved vermiculite soil conditioner that is of light weight and is easily handled and has the ability of imparting improved stability to the soil structure.

It is still a further object of my invention to provide an improved soil conditioner of the polyacrylate type containing a light weight carrier or extender which facilitates the uniform distribution thereof and which cooperates therewith in carrying out the soil conditioning functions.

It is still another object of my invention to provide an improved method for conditioning soil that comprises admixing therewith a small amount of exfoliated vermiculite particles, a water soluble polyacrylate and water.

It is yet a further object of my invention to provide an improved method of preparing a seed bed which comprises intimately admixing soil and exfoliated vermiculate particles in a volume ratio of 3–5:1 and also admixing therewith a small amount of a water soluble sodium polyacrylate and water.

It is yet another object of my invention to provide an improved method of treating a polyacrylate type of soil conditioner that comprises intimately admixing therewith a small amount of dry exfoliated vermiculite particles.

Still a further object of my invention is to provide an improved method of treating a vermiculite soil conditioner that comprises spraying or otherwise intimately admixing therewith a proportion of a water soluble sodium polyacrylate.

Still other important objects of my invention include the provision of the improved soil conditioners, seed beds and conditioned soil resulting from carrying out the aforementioned methods of my invention.

Other objects, features and advantages of the present invention will become apparent to one skilled in the art from the following description of embodiments thereof.

As hereinbefore mentioned, my invention is based upon the discovery that exfoliated particulate vermiculite and certain polyacrylate compounds, to be described in detail hereinafter, are uniquely capable of cooperating in a plurality of different manners and circumstances, so as to obtain soil conditioners, seed beds, and conditioned soil, each of which possesses properties and characteristics superior to those heretofore obtained by those skilled in the art.

The polyacrylates or acrylic polymers employed in the instant invention are the water-soluble low molecular weight "acrylics" which include polyacrylic acid, polymethacrylic acid, and the alkali metal salts thereof, and mixtures and/or copolymers of such compounds. Such polyacrylic and polymethacrylic acids, and mixtures and/or copolymers thereof, may thus be defined as a water-soluble alkenecarboxylic acid polymer, the alkenecarboxylyl radical of such acid having not more than 4 carbon atoms and not more than 3 of such carbon atoms form a straight chain. The least number of carbon atoms possible in alkenecarboxylic acid is 3, since 2 must be employed to form the >C=C< group of the alkene portion and 1 must be employed in the >C=O group of the carboxylic acid radical. Those 3 carbon atoms form a straight chain,

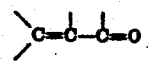

which is the maximum length provided for by the instant definition and an additional carbon atom, if present, in the molecule must be attached to the alpha carbon atom to form the structure:

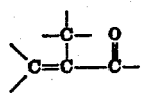

It can thus be seen that alkenecarboxylyl structures so defined are, as follows:

| Acrylyl | Methacrylyl |
|---|---|
| $CH_2=CH-\overset{O}{\underset{}{C}}-$ | $CH_2=\overset{CH_3}{\underset{}{C}}-\overset{O}{\underset{}{C}}-$ |

In the polymerization of compounds containing such polymerizably reactive alkenecarboxylyl radicals, the polymerization is an addition polymerization reaction involving the formation of a polymer chain structure whereby each of such acyl radicals is connected via the olefinic double bond therein, as represented in Equation 1 as follows:

(1)
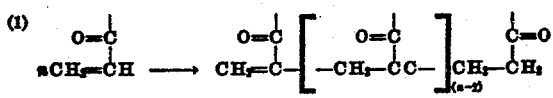

The "saturated" polymeric repeating chain units or the units comprising the polymeric chain structure are thus:

| For Acrylyl Type | For Both Types |
|---|---|
| $H-\overset{CH_2}{\underset{}{C}}-\overset{O}{\underset{}{C}}-$ | $R-\overset{CH_2}{\underset{}{C}}-\overset{O}{\underset{}{C}}-$ | wherein R may be H or CH₃.

One method of preparing such alkenecarboxylic acid polymers involves the polymerization of methacrylonitrile and/or acrylonitrile ($CH_2=CR-C\equiv N$) and the subsequent hydrolysis of the polymer to convert the nitrile radicals to carboxylic acid radicals, as represented in connection with the chain units in Equation 2 below:

(2)
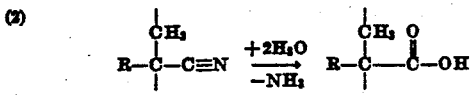

In the case of low polymers wherein the molecular size and complexity is not too great and wherein cross-linking through the nitrile groups has been substantially inhibited, the hydrolysis reaction may be substantially completely effected and the resulting chain structure consists almost entirely of the repeating carboxylic group-containing unit shown as the product in Equation 2.

The alkenecarboxylic acid polymer used in the instant invention may comprise such unmodified acid units in its polymer chain, or it may be additionally modified by a neutralization reaction involving replacement of the acid H with an alkali metal. Such neutralization may be only partial or it may be carried to substantial completion. (Theoretically complete neutralization, like theoretically complete hydrolysis according to Equation 2, is very probably an impossibility because of such factors as steric hindrance). The neutralization reaction may be carried out by the use of any neutralizingly reactive alkali metal donor, preferably the hydroxide, as shown in Equation 3 below:

(3)
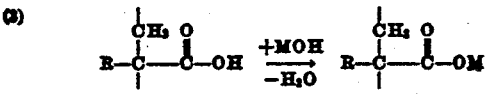

wherein M is an alkali metal atom.

The alkali metals are the monovalent metals of Group 1A of the Periodic System, which include sodium (Na) and potassium (K) as the principal members from an industrial point of view. The alkali metals also include lithium, rubidium and cesium, but only sodium and potassium are preferred for use in the instant invention and sodium is most preferred because of its availability and inexpensiveness.

Accordingly, the acrylic polymer preferably employed in the instant invention is one whose polymer chain structure comprises units having the following formula:

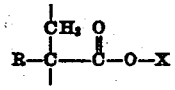

wherein R is H or CH₃ and X is H, Na or K. Needless to say, such structure contemplates the use therein of mixtures and/or copolymers of acrylyl and methacrylyl derived groups, as well as the partial or complete replacement of the acid H's by Na or K or any combination thereof. Also, such polymeric chain structure may be prepared by methods other than the method hereinbefore described, for example, by direct polymerization of sodium acrylate. Additional flexibility in the practice of the invention may be obtained by the use of acrylic-methacrylic acid polymers and alkali metal polyacrylate-polymethacrylate compositions because the presence or absence of the CH₃ group at the "R" position affects the hydrophilic-hydrophobic properties of the polymer molecule and these properties are of particular importance in soil conditioning.

It has been found that sodium polyacrylates are very effective in the practice of the invention; but the polyacrylic acids presently available are also effective and may be used in smaller quantities. Also, the polyacrylic acids have viscosities such that they are more easily handled. On the other hand, it has been found that sodium polyacrylates are most preferred.

The polyacrylic and polymethacrylic acids, and the alkali metal polyacrylates and polymethacrylates, and mixtures thereof, which may be used in the instant invention are essentially low polymers, which are water-soluble. It is, of course, well known that acrylic compounds may be polymerized to yield high molecular weight or "high" polymers which are solid resinous bodies that may or may not be solvent-soluble, but which are water-insoluble. As the molecular weight of such polymers increases the water solubility decreases until, at a given high molecular weight, the polymer is substantially completely water-insoluble. The instant invention contemplates the use of low molecular weight polymers which may be defined as the "water-soluble" polymers, but which preferably have a molecular weight of more than about 50,000.

Another method of indicating polymer molecular weight involves the use of the viscosity of the polymer, preferably in some standard solution (at 25° C. usually). Two well known devices for measuring viscosity of polymer solutions are the Brookfield viscometer and the Ostwald pipette. Brookfield viscosities are specified in centipoises, whereas Ostwald pipette viscosities are specified in centistokes. The following viscosity specifications are available for commercial compounds suitable for use in the invention:

Compound A is a relatively pure polyacrylic acid produced synthetically from acrylic acid, available under the name "Acrysol A-1" (Rohm and Haas) in 25 weight percent solids aqueous solution; a 5% solids aqueous solution having an Ostwald pipette viscosity of 10 centistokes.

Compound B is a relatively pure polyacrylic acid produced synthetically from acrylic acid available under the name "Acrysol A-1-LV" (Rohm and Haas) in 25% solids aqueous solution, a 5% solids aqueous solution having an Ostwald pipette viscosity of 4 centistokes.

Compound C is a relatively pure polyacrylic acid produced synthetically from acrylic acid, available under the name "Acrysol A-1-XLV" (Rohm and Haas) in 25% solids aqueous solution, a 5% solids aqueous solution having an Ostwald pipette viscosity of 2 centistokes.

Compound D is a sodium salt of a polyacrylic acid made by hydrolysis of polyacrylonitrile, available under the name "Acrysol-GS-NEW" (Rohm and Haas) in 12% solids aqueous solution, such solution having a Brookfield viscosity of 13,000 centipoises and a 5% solids aqueous solution has a Brookfield viscosity of 1050 centipoises or an Ostwald pipette viscosity of 586 centistokes.

Compound E is a sodium salt of polymethacrylic acid, available under the name "Acrysol G-4694" (Rohm and Haas) in 40% solids aqueous solution, a 5% solids aqueous solution having substantially the same viscosity as that of compound D.

Compound F is a sodium salt of a polyacrylic acid made by hydrolysis of polyacrylonitrile, available under the name "Krilium" (Monsanto) as a dry water-soluble powder having a molecular weight greater than 50,000. A 5% solids aqueous solution thereof has a Brookfield viscosity of 3110 centipoises; and a 1% solids solution has a viscosity of 110 centipoises.

The foregoing compounds are infinitely dilutable in hot or cold water. Such compounds are, however, coagulated by acids and also by certain salts of polyvalent metals. This latter property might have indicated that such compounds could not function reliably in the presence of the polyvalent calcium and magnesium salts in hard water and in the soil, but it has been found that such is not the case. Although there may be some reactions of such character taking place with the polyvalent ions present in the practice of the invention, it appears that these reactions effect an advantageous result, if anything.

If compounds A, B or C is converted to an alkali metal salt thereof, for example, by reaction of sodium hydroxide therewith, then Ostwald pipette viscosity of a 5% aqueous solution thereof is increased by a factor of approximately 6. Thus, a 5% aqueous solution of the sodium salt of the polyacrylic acid of compound A has an Ostwald pipette viscosity of about 60 centistokes.

The acrylic polymers suitable for use in the instant invention may be water-soluble polymers of such molecular weight that 12½% aqueous solutions thereof have a Brookfield viscosity ranging from about 5,000 to about 50,000 centipoises, and preferably about 20,000 to 30,000 centipoises in the case of the polymer salts in particular.

Good results may be obtained using the polyacrylic acids of compounds A, B and C, whose 5% aqueous solutions have Ostwald pipette viscosities ranging from about 2 to about 10 centistokes. On the other hand, operative acrylic polymers (acids and/or salts) of the invention may include those whose 5% aqueous solutions have Ostwald pipette viscosities ranging from about 1 to about 2,000 centistokes, and preferably about 500 to about 2,000 centistokes; or Brookfield viscosities of preferably about 1,000–5,000 centipoises.

In general, I have found that compound F is preferred for use in the practice of my invention, although in some instances, the application of a coating of one of the other compounds to the vermiculite particles, in a manner to be described hereinafter, may be preferred.

As hereinbefore mentioned, exfoliated particulate vermiculite, or exfoliated vermiculite particles, are well known in the art and need not be described in detail. In general, the particle size employed is essentially a matter of choice, consistent with the particle sizes ordinarily employed in soil conditioning compounds of this nature, and in general, the particles used are small enough to pass through a one-half inch mesh screen and large enough to be retained by a thirty mesh screen, if used as a carrier; but if used as a diluent, in this invention the particle sizes may be —30 mesh and smaller, even including —200 mesh.

It is believed that the various features and advantages of my invention may be best disclosed to those skilled in the art by reference to specific preferred procedures and compositions. For example, in United States Patent No. 2,240,859, issued to Ralph W. Rice on May 6, 1941, there is described in detail a procedure for the preparation of a seed bed, consisting in the admixture of soil and vermiculite in predetermined proportions, which procedure may be greatly improved by carrying out the procedure of the instant invention.

In other words, if a mixture of one volume of exfoliated particulate vermiculite and 3–5 volumes of soil is also admixed with a relatively minor amount of the polyacrylate compound, such as 0.02–0.2 weight percent of the mixture of compound F, plus 15–20 or more weight percent of compound F of water, a very substantial improvement in seed sprouting properties particularly will be obtained. The general properties such as aeration, workability, water retentivity and aggregate structure thereby obtained will also be found to be substantially superior to the minor or negligible amount of improvement, if any, that might be expected to result from the addition of such a small proportion of the polyacrylate compound.

Although the precise soil conditioning functions of the vermiculite, as well as the polyacrylate compound cannot be fully understood, it is generally recognized that the vermiculite affords improved water retentivity and soil aeration because of its immense available surface area per unit volume, and the polyacrylates presumably bond soil particles into water-stable aggregates which carry out a substantially similar function. It will thus be expected that neither could appreciably effect or improve upon the functions of the other. Such, however, is not the case. Having discovered this, I have now drawn certain conclusions by which I am, of course, not to be bound but which I offer by way of an explanation for the superior results obtained in the practice of the instant invention.

The polyacrylates, presumed to be polyelectrolytes or polyanions, are understood to be adsorbed on clay particles. The additional surface area afforded by vermiculite particles, in a medium already containing an excess of surface area, should have little or no effect upon the adsorption phenomenon. Experimental evidence, however, indicates that the extent of adsorption is a function of the ion exchange capacity of the clay. A fact which I have discovered, and which was not heretofore appreciated, is that exfoliated particulate vermiculite has an unexpectedly high exchange capacity and I, therefore, believe that the unexpectedly superior results obtained in the practice of the instant invention are attributable, at least, in part to the cooperation between the polyacrylate polyanions and the vermiculite based upon the unexpectedly high ion exchange capacity of the vermiculite.

Table 1 (below) sets forth the ion exchange capacities for various cations (in milli-equivalent weights per 100 grams of vermiculite) for vermiculite ore, having a density of 90 lbs./cu. ft., and for expanded or exfoliated vermiculite, having a density of 7.1 lbs./cu. ft.

*Table 1*

| Cation | Vermiculite | |
|---|---|---|
| | Ore | Expanded |
| Ca | 18 | 16.8 |
| Mg | 10 | 7.9 |
| K | 0.2 | 1.3 |
| Mn | 0.03 | 0.1 |
| Total | 28+ | 26+ |

The unexpectedly high exchange capacity for the expanded vermiculite is very significant, since the activity of the polyacrylates, particularly in very low concentrations, is understood to be greatly enhanced by the presence of such cations as Ca and Mg.

If a procedure such as the aforementioned procedure, paralleling that used in the Rice patent, is carried out using each of the compounds A, B, C, D, E or mixtures thereof in place of compound F, substantially the same improvement is obtained. Each of such compounds in water-soluble (colloidally) but after its incorporation in the soil-vermiculite mixture it becomes water-insoluble to the extent it cannot be leached out, presumably because of the strong absorption-like attractive forces which retain the compound therein.

In general, the amount of the polyacrylate compound used should be about 0.02-0.2 weight percent of the soil plus the vermiculite, and preferably about 0.1 weight percent thereof. As used herein, the term "weight percent" means dry weight percent, unless otherwise specified. Almost invariably there is an appreciable moisture content in the soil or in soil-like media. The proper functioning of the polyacrylate apparently calls for the creation of polyanions thereof, which in turn calls for the presence of an appreciable amount of water. Accordingly, for optimum operating results, the addition of the polyacrylates should be accompanied by the combination therewith of at least about 15-20 weight percent thereof of water. Such water may be already present in the soil-like media or it may be added thereto, and the total amount of water present may, of course, be substantially in excess of that preferred minimum, being for example, as much as 100 times the polyacrylate weight.

A particular advantage of vermiculite in this respect resides in the amazing water-absorbing properties of vermiculite. In a vermiculite-polyacrylate soil conditioner which may be offered commercially, the vermiculite may contain a substantial amount of water without destroying its generally pulverulent, easily-handled properties. This is useful for several purposes.

For example, in the treatment of exfoliated particulate vermiculite which is to be sold for use in the preparation of seed beds wherein a substantial volume thereof (e. g. at least about 10 percent) will consist of vermiculite and the remainder will be soil, soil-like ingredients and/or plant nutrients, it is of particular advantage to admix with the vermiculite particles a small amount (e. g. 0.02-0.2 weight percent) of the polyacrylate. Such polyacrylate may be added thereto merely in spray-dried or powdered form, and the complex leaf-like vermiculite particle structure is capable of trapping the powdered material so as to maintain uniform blending thereof without appreciable settling out. Preferably, however, the vermiculite particles are spray-coated by an aqueous solution (of 1-25 weight percent and preferably 5 weight percent) of the polyacrylate, and the amount of water that need be removed by drying, if any, is that amount which permits the subsequent collection of the resulting particles in the form of discrete particles dry to the touch, for ready commercial use.

In instances involving the preparation of a vermiculite soil conditioner to be added to a substantial amount of soil, as, for example, in amounts of about one pound per 100 square feet of soil, the amount of the polyacrylate that is admixed therewith (preferably by spray-coating thereon, as described) may range from 0.2 to 100 weight percent of the vermiculite. The very great volume of the vermiculite affords a means of uniformly distributing the relatively small volume of the polyacrylate (admixed therewith or adhered thereto), so that both may be uniformly distributed, for example, in amounts for each of one pound per 100 square feet of soil. The results thus obtained are uniquely improved soil conditioning as well as unusually simplified and uniform soil conditioner application.

Also, the vermiculite may carry some or all of the water necessary for the carrying out of the polyacrylate-polyanion functions. A particular advantage, in this respect, is obtained by treating vermiculite with 0.02-0.2 weight percent thereof of the polyacrylate in the presence of water so that at least water in the amount of 15-20 weight percent of the polyacrylate is retained in the vermiculite.

In general, the amounts of the vermiculite and of the polyacrylate added per 100 square feet of soil in fields to be conditioned may each range from about 0.5 to about 2 pounds. Such a weight constitutes a very small volume of the polyacrylate, but a large volume of vermiculite, thereby permitting the vermiculite to perform the additional function of being a carrier for uniform distribution of the polyacrylate. In smaller soil areas, or in the preparation of plots of soil-like media, wherein the addition of greater amounts of vermiculite is desired or economically justified, then the amount of vermiculite employed may be as much as 0.05-5 weight percent of the soil. Used in such amounts, with 0.02-0.2 percent of the soil's weight of the polyacrylate, the vermiculite performs ideally as a carrier and also may be employed to carry a substantial portion or all of the water ordinarily necessary for coaction with the polyacrylate.

As has just been pointed out, in the use of vermiculite-polyacrylate combinations wherein there is a substantial proportion of vermiculite, the vermiculite performs a plurality of functions including that of being a carrier for the polyacrylate, a carrier for a certain amount of moisture for coaction with the polyacrylate, and coreactant with the polyacrylate in the soil conditioning functions involving such physical and chemical phenomena as adsorption and ion exchange. Still another function may be performed by the use of even small amounts of vermiculite in an essentially polyacrylate soil conditioner.

The polyacrylates have been found to possess noticeable hygroscopicity, which results in caking of the powdered material as well as impurity accumulation, deactivation and the like harmful effects. By the addition of vermiculite to a pulverulent polyacrylate soil conditioner in amounts ranging from a mere appreciable amount (i. e. 5 parts per 1000 by weight) to a substantial amount (i. e. 20 parts per 1000 by weight) which may be added without appreciably altering the appearance and general physical properties thereof, the harmful effects of hygroscopicity are substantially completely prevented. In effect, the vermiculite prevents caking and the like effects and tends to absorb the water so as to prevent hygroscopic accumulation thereof in the immedaite vicinity of each polyacrylate particle. Moreover, instead of subtracting from the soil conditioning properties of the polyacrylate, as a normal extender would be expected to do, the vermiculite adds to such properties in the manner hereinbefore described. In general, about 2-10 cubic feet (i. e. about 15-80 pounds) of vermiculite produces a very marked improvement on a ton of powdered polyacrylate.

In this connection, it should also be noted that the hygroscopic tendency of powdered polyacrylates may also be greatly decreased by a pretreatment comprising silane-coating the particles thereof. Such may be done, for example, by exposure 10 grams thereof to a closed liter of silico-chloroform (or other volatile silane) for 5-10 minutes under room temperature conditions. The reduction in hygroscopicity so obtained may be demonstrated by sprinkling some of the treated material upon water and noticing that it floats temporarily, instead of sinking immediately and going into solution.

It will thus be seen that the vermiculite-polyacrylate soil conditioner composition of the invention may contain these two ingredients in weight ratios ranging from 5:1000 to 1000:0.2, the former extreme relating to essentially polyacrylate conditioners, the latter extreme relating to essentially vermiculite conditions and the intermediate portions of the range relating primarily to combinations of the two types ordinarily used in relatively small proportions in the treatment of large acreages of soil.

It will be understood that modifications and variations may be effected without departing from the scope of the novel concepts of the present invention.

I claim as my invention:

1. A method of conditioning soil that comprises intimately admixing therewith 0.05 to 5 weight percent thereof of exfoliated vermiculite particles, 0.02 to 0.2 weight percent thereof of sodium polyacrylate whose 12½ weight percent aqueous solution has a Brookfield viscosity of 5,000 to 50,000 centipoises and water in an amount that is at least equivalent to 15–20 weight percent of the sodium polyacrylate.

2. A method of preparing a seed bed which comprises intimately admixing soil and exfoliated vermiculite particles in a volume ratio of 3–5:1 and also admixing therewith .02 to 0.2 weight percent of the mixture of a water soluble sodium polyacrylate plus 15–20 percent of its weight of water.

3. A method of treating soil that comprises uniformly spreading over the same a mixture of exfoliated vermiculite particles and a pulverulent water-soluble sodium polyacrylate of molecular weight greater than 50,000 in amounts of each ranging from 0.5 to 2 pounds per 100 square feet of soil.

4. A method of treating a dry pulverulent water-soluble sodium polyacrylate soil conditioner that comprises intimately admixing therewith 2–4 cubic feet per ton of dry exfoliated vermiculite particles.

5. A method of treating a dry exfoliated vermiculite particulate soil conditioner that comprises spray coating the particles thereof with from 0.2 to 100 weight percent thereof of a water-soluble sodium polyacrylate and collecting the resulting spray coated particles in the form of discrete particles dry to the touch.

6. A method of preparing a seed bed which comprises intimately admixing soil and exfoliated vermiculite particles in a volume ratio of 3–5:1 and also admixing therewith 0.02 to 0.2 weight percent of the mixture of a water-soluble acrylic polymer whose polymer chain structure comprises units having the following formula:

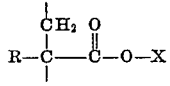

wherein R is of the class consisting of H and CH₃, and X is of the class consisting of H, Na and K, a 5 weight percent aqueous solution of such polymer having a Brookfield viscosity of 1000–5000 centipoises.

7. A composition comprising (a) a water-soluble alkenecarboxylic acid polymer, each alkenecarboxylyl radical of said acid having not more than 4 carbon atoms and not more than 3 of such carbon atoms forming a straight chain, and (b) exfoliated vermiculite particles, the weight ratio of (a) and (b) ranging from 0.2:1000 to 1000:5.

8. A composition comprising (a) a water-soluble alkenecarboxylic acid polymer wherein the carboxylic acid radicals have been neutralized by replacement of the acid H with an alkali metal, the alkenecarboxylyl radical of said acid having not more than 4 carbon atoms and not more than 3 of such carbon atoms forming a straight chain, and (b) exfoliated vermiculite particles, the weight ratio of (a) to (b) ranging from 0.2:1000 to 1000:5.

9. A composition comprising (a) a sodium polymethacrylate whose 12½ weight percent aqueous solution has a Brookfield viscosity of 5000 to 50,000 centipoises, and (b) exfoliated particulate vermiculite, the weight ratio of (a) to (b) being 0.2–2 to 1000.

10. A composition comprising (a) a polyacrylic acid whose 5 weight percent aqueous solution has an Oswald pipette viscosity of 1 to 2000 centistokes, (b) exfoliated particulate vermiculite, the weight ratio of (a) to (b) being 0.2–2 to 1000.

11. A composition comprising (a) a water-soluble acrylic polymer whose polymer chain structure comprises units having the following formula:

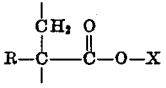

wherein R is of the class consisting of H and CH₃ and X is of the class consisting of H, Na and K, a 5 weight percent aqueous solution of such polymer having an Oswald pipette viscosity of 1 to 2000 centistokes, and (b) exfoliated particulate vermiculite, the weight ratio of (a) to (b) ranging from 0.2:1000 to 1000:5.

12. A composition comprising (a) a water-soluble acrylic polymer whose polymer chain structure comprises units having the following formula:

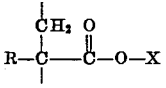

wherein R is of the class consisting of H and CH₃ and X is of the class consisting of H, Na and K, a 5 weight percent aqueous solution of such polymer having an Oswald pipette viscosity of 1 to 2000 centistokes, and (b) exfoliated particulate vermiculite, the weight ratio of (a) to (b) being 0.2–2 to 1000.

13. A composition comprising (a) a water-soluble acrylic polymer whose polymer chain structure comprises units having the following formula:

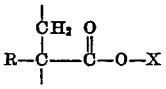

wherein R is of the class consisting of H and CH₃ and X is of the class consisting of H, Na and K, a 5 weight percent aqueous solution of such polymer having an Oswald pipette viscosity of 1 to 2000 centistokes, and (b) exfoliated particulate vermiculite, the weight ratio of (a) to (b) being 1000 to 5–20.

14. A composition comprising (a) a spray dried sodium polyacrylate whose 12½ weight percent aqueous solution has a Brookfield viscosity of 5000 to 50,000 centipoises, and (b) exfoliated particulate vermiculite, the weight ratio of (a) to (b) being 1000 to 5–20.

15. A soil conditioner comprising discrete particles of exfoliated vermiculite coated with 0.02 to 0.2 weight percent thereof of a water soluble sodium polyacrylate having a molecular weight in excess of 50,000, said vermiculite containing absorbed water in an amount at least equal to 15–20 weight percent of the sodium polyacrylate.

References Cited in the file of this patent

UNITED STATES PATENTS

| | | |
|---|---|---|
| 1,608,917 | Widdis | Nov. 30, 1926 |
| 2,240,859 | Rice | May 6, 1941 |
| 2,516,591 | Remington | July 25, 1950 |
| 2,651,883 | Hedrick et al. | Sept. 15, 1953 |